US012770328B2

(12) United States Patent
Milne et al.

(10) Patent No.: US 12,770,328 B2
(45) Date of Patent: Oct. 20, 2026

(54) 3D PARTICLE IMAGING IN PHARMACEUTICAL CONTAINERS

(71) Applicant: AMGEN INC., Thousand Oaks, CA (US)

(72) Inventors: Graham F. Milne, Ventura, CA (US); Dmitry Fradkin, Woodland Hills, CA (US); Thomas Clark Pearson, Newbury Park, CA (US)

(73) Assignee: AMGEN INC., Thousand Oaks, CA (US)

( * ) Notice: Subject to any disclaimer, the term of this patent is extended or adjusted under 35 U.S.C. 154(b) by 8 days.

(21) Appl. No.: 18/397,218

(22) Filed: Dec. 27, 2023

(65) Prior Publication Data

US 2024/0127540 A1 Apr. 18, 2024

Related U.S. Application Data

(63) Continuation of application No. 17/616,548, filed as application No. PCT/US2020/035674 on Jun. 2, 2020, now Pat. No. 11,900,540.

(Continued)

(51) Int. Cl.
*G01N 15/0227* (2024.01)
*G01N 15/06* (2024.01)
(Continued)

(52) U.S. Cl.
CPC ......... *G06T 17/20* (2013.01); *G01N 15/0227* (2013.01); *G01N 15/06* (2013.01);
(Continued)

(58) Field of Classification Search
CPC ... G01N 15/10–1492; G06T 7/30; G06T 7/32; G06T 7/33
See application file for complete search history.

(56) References Cited

U.S. PATENT DOCUMENTS 5,905,568 A 5/1999 McDowell et al.
8,922,636 B1 12/2014 Belden et al.
(Continued)

FOREIGN PATENT DOCUMENTS

WO WO-2013/033253 A1 3/2013

OTHER PUBLICATIONS

"Checking image feature alignment." 2009. Stack Overflow. Retrieved from https://stackoverflow.com/questions/967436/checking-image-feature-alignment on Apr. 2, 2025 (Year: 2009).*

(Continued)

*Primary Examiner* — Ryan McCulley
(74) *Attorney, Agent, or Firm* — MARSHALL, GERSTEIN & BORUN LLP

(57) ABSTRACT

A method of aligning images for 3D imaging of a sample includes, for each of multiple cameras located around a vessel, activating a respective light source that provides backlighting for the vessel, and capturing a respective 2D calibration image of the vessel. The method also includes, for each 2D calibration image, measuring a respective vertical position, horizontal position, and rotation of the image, in part by detecting edges of the vessel as depicted in the image. The method also includes generating calibration data based on the measured vertical positions, horizontal positions, and rotations for the respective 2D calibration images, capturing, by each camera, a respective set of 2D images of the sample in the vessel, and digitally resampling, using the calibration data, at least one of the respective sets of 2D images to correct for vertical offset, horizontal offset, and rotational offset of the set(s) of 2D images.

20 Claims, 10 Drawing Sheets

Related U.S. Application Data

(60) Provisional application No. 62/856,267, filed on Jun. 3, 2019.

(51) Int. Cl.

| | |
|---|---|
| ***G06T 7/00*** | (2017.01) |
| ***G06T 7/20*** | (2017.01) |
| ***G06T 15/06*** | (2011.01) |
| ***G06T 17/20*** | (2006.01) |
| ***G06V 10/762*** | (2022.01) |
| ***H04N 5/06*** | (2006.01) |
| *G01N 15/075* | (2024.01) |

(52) U.S. Cl.

CPC .............. *G06T 7/0012* (2013.01); *G06T 7/20* (2013.01); *G06T 15/06* (2013.01); *G06V 10/763* (2022.01); *H04N 5/06* (2013.01); *G01N 15/075* (2024.01); *G06T 2200/08* (2013.01); *G06T 2207/30242* (2013.01)

(56) References Cited

U.S. PATENT DOCUMENTS

| | | | | |
|---|---|---|---|---|
| 2010/0310175 | A1* | 12/2010 | Holt | G06T 7/0004 382/195 |
| 2012/0274746 | A1 | 11/2012 | Wieneke | |
| 2014/0002617 | A1 | 1/2014 | Zhang et al. | |
| 2014/0177932 | A1* | 6/2014 | Milne | G01N 15/1433 382/128 |
| 2016/0379376 | A1 | 12/2016 | Milne et al. | |
| 2019/0045176 | A1 | 2/2019 | Ratcliff et al. | |

OTHER PUBLICATIONS

Kent et al., "Dynamic Photogrammetry Utilizing High-Speed Digital Imaging", Proceedings of SPIE, IEEE, vol. 2869, Jan. 1, 1997, pp. 794-797.

Search Report and Written Opinion in International Application No. PCT/US2020/035674 dated Nov. 10, 2020, 20 pages.

European Patent Application No. 25214043.9, Extended European Search Report, dated Mar. 3, 2026.

* cited by examiner

3D PARTICLE IMAGING IN PHARMACEUTICAL CONTAINERS

CROSS-REFERENCE TO RELATED APPLICATIONS

This is a continuation of U.S. patent application Ser. No. 17/616,548, which is a Dec. 3, 2021 national stage entry of PCT/US20/35674, filed on Jun. 2, 2020, which claims the benefit of U.S. Provisional Patent Application No. 62/856,267, filed on Jun. 3, 2019. The entire disclosure of each of the above-identified applications is hereby incorporated by reference herein.

FIELD OF DISCLOSURE

The present application relates generally to particle imaging, and more specifically to techniques for three-dimensional (3D) imaging of particles in containers/vessels in pharmaceutical or other applications.

BACKGROUND

In certain contexts, such as quality control procedures for manufactured drug products, it is necessary to examine samples (e.g., fluid samples) for the presence of various particles (e.g., protein aggregates or debris). The acceptability of a given sample, under the applicable quality standards, may depend on metrics such as the number and/or size of undesired particles contained within the sample. If a sample has unacceptable metrics, it may be rejected and discarded.

To handle the quantities typically associated with commercial production of pharmaceuticals, the particle inspection task has increasingly become automated. However, automated inspection systems have struggled to overcome various barriers to achieving good particle measurement fidelity. In particular, accurate sizing and counting of particles in drug products remains a challenge to the industry. The primary technical barrier is the distortion of the image caused when imaging through the sidewall of a curved container (e.g., vial or syringe), which leads to blind spots as well as artificial magnification and/or shape distortion of particles or other objects (e.g., bubbles) in the fluid volume. Moreover, projecting a 3D volume onto a 2D image poses significant challenges for certain particle analysis techniques, such as particle tracking.

Even if multiple cameras are employed (e.g., as described in U.S. Pat. No. 9,418,416 to Milne et al.), technical hurdles remain. For example, the cameras may fail to properly detect particles having certain shapes when those particles are oriented in a particular manner relative to the cameras, and may result in the detection of "ghost particles" where no actual particles exist, as discussed in further detail below. Moreover, to provide useful image information, multi-camera systems may require very precise temporal synchronization and spatial alignment, which can be challenging to achieve. With respect to spatial alignment, for instance, many factors may cause image misalignment, such as interactions between vessels (e.g., vessel flanges) and gripping mechanisms (e.g., grasping components of robotic arms), manufacturing tolerances of vessels, tolerances in camera placement, and so on.

SUMMARY

Embodiments described herein relate to systems and methods that improve upon conventional visual inspection techniques for containers (e.g., pharmaceutical vessels). In particular, a system implementing the instant invention provides for three-dimensional (3D) imaging of a sample within a vessel, by processing two-dimensional (2D) images captured by multiple cameras positioned around the perimeter of the vessel. By processing 2D images corresponding to different perspectives, and accessing one or more look-up tables representing ray optics through the vessel and sample (or representing phenomena that are approximated by other optical modeling techniques), the system generates a 3D image or model of the sample (including any particles and/or bubbles, etc., therein). The system may use the look-up table(s) to determine which pixels of which 2D images correspond to common locations within the sample volume (e.g., the points within the sample at which different ray optic paths, associated with different pixel sensors of the multiple cameras, intersect). In this manner, for example, a 3D voxel grid representing the sample volume may be constructed, e.g., with each voxel being assigned a value to indicate whether an object or object portion is present (or, in some embodiments, is likely present) in that voxel.

3D imaging has important advantages over 2D imaging. For example, the multiple cameras used for 3D imaging greatly reduce the impact of blind spots that each individual camera may have due to curvature of the vessel and refraction. Moreover, the look-up tables can map the optical distortion caused by the curved vessel surfaces, via calculation and/or empirical measurements, in order to correct for such distortion when constructing 3D image. In addition to determining accurate particle position, 3D imaging may allow for accurate determination of particle size and shape, as well as more accurate particle classification.

Accurate positioning of particles, as well as accurate size and shape determination, greatly assists (and potentially simplifies) particle tracking algorithms. Moreover, 3D imaging can ameliorate issues associated with occlusion by cosmetic defects (e.g., dirt on the vessel surface). For 2D imaging, on the other hand, particles can "hide" behind "dead" regions in the image associated with these defects. This complicates tracking as particles can disappear and reappear on opposite sides of the defects areas. Conversely, with 3D imaging, the position of a given particle is known at all (or most) times, making tracking of the particle comparatively easy. For instance, it is easier to build trajectories from one frame to another (e.g., by simply matching a particle in one 3D frame to the nearest candidate particle in another 3D frame, if the camera frame rate is fast enough).

Similarly, in the 2D imaging case, particles can occlude one another. In densely populated samples this can become a major challenge. While complex 2D tracking algorithms have been proposed to attempt to overcome these challenges, with varying degrees of success, 3D imaging may remove (or greatly lessen) the problem of particle occlusion in the first instance, and make complex tracking algorithms unnecessary. This is because, even if particles overlap from the perspective of one camera, the positions of those particles can, in all or most instances, be easily differentiated using the two or more other camera images. Moreover, 2D images or frames of particles generally fail to capture the "smoothness" of particle trajectories, which commonly follow circular or helical paths (e.g., after agitation of the vessel). In two dimensions, such paths may map to sharp sinusoidal paths, or even zig-zag paths, with abrupt changes in apparent particle velocity. As a result, the particle tracking algorithm may easily falter and lose a given particle. In three dimensions, of course, the full 3D path can be observed.

Thus, with 3D imaging, even relatively simple tracking algorithms may produce useful results.

In addition, the cameras of the disclosed system are configured/oriented so as to avoid various artifacts that could arise if the optical axes of all of the cameras were within the same plane (e.g., a "horizontal plane" that is orthogonal to the vertical or longitudinal axis of the vessel, as proposed in U.S. Pat. No. 9,418,416). One such artifact is depicted in FIGS. 1A and 1B. As seen in FIG. 1A, a fiber 100 exhibits a C-shape within an x-y plane. If the optical axes of all cameras are within the x-y plane (as may likely occur for at least some particles in a given sample, at certain times), then the resulting 2D images may fail to properly detect the shape of the fiber 100, regardless of where, around the z-axis, the cameras are positioned. In particular, because no camera is "looking down at" or "looking up at" the particle from a different perspective (i.e., from a higher or lower position on the z-axis), the fiber 100 appears to be a solid disc 102 that lies within the x-y plane, as depicted in FIG. 1B. Similar problems are also likely to occur for particles having other shapes, such as a coiled hair or fiber.

An example of another potential artifact is depicted in FIG. 2, for the case where three cameras (not shown in FIG. 2) are arranged in a horizontal plane around a vessel 200 (e.g., a syringe, vial, etc.). FIG. 2 depicts a top-down view of a cross-sectional slice of vessel 200 and the sample (e.g., drug product) within vessel 200, with each of three optical paths (202*a* through 202*c*) corresponding to a different one of the cameras in the horizontal plane. Each of paths 202*a* through 202*c* may correspond to a single pixel in a single pixel row for the corresponding camera, for example. For ease of illustration, FIG. 2 does not depict the refraction that occurs as the paths 202*a* through 202*c* travel into or though the wall of vessel 200.

As seen in FIG. 2, in the scenario depicted, objects (e.g., particles) 204*a*, 204*b* and 204*c* are within the paths 202*a*, 202*b* and 202*c*, respectively. Thus, a system processing the images of the three cameras may view the pixels corresponding to paths 202*a*, 202*b* and 202*c* as each being an "object present" pixel. However, if 2D look-up tables are used to determine which positions within the depicted cross-sectional slice correspond to which optical paths, the processing system will translate or map the three detected objects to the intersection location 210. In other words, the system will determine that a particle exists at location 210, even if no particle in fact exists at location 210 when the images are captured. This is referred to herein as the "ghost particle" phenomenon.

To ameliorate these problems, while still supporting 3D particle detection and tracking, at least one of the three or more cameras may be tilted up (inclined) or down (declined) relative to the optical axes of one or more other cameras. By providing different camera perspectives (in terms of angle/tilt relative to the horizontal plane of a vessel), the likelihood of misidentifying the shape of a particle (e.g., as in FIGS. 1A and 1B), and/or of detecting a "ghost particle" (e.g., as in FIG. 2), may be substantially reduced. However, the optical path(s) of any camera(s) that is/are inclined or declined relative to the horizontal plane will naturally travel through different cross-sectional slices of the vessel/sample. Accordingly, the present invention utilizes a 3D look-up table, rather than a 2D look-up table, for at least one camera. For example, a system implementing the invention may utilize a 3D look-up table at least for any camera that is inclined or declined relative to the horizontal plane (i.e., having an optical axis that is not substantially orthogonal to the longitudinal/vertical axis of the vessel), and possibly for all cameras. The 3D look-up table may account for each pixel in each row of the images captured by a given camera, and map each such pixel to a respective set of voxels in a 3D representation/image/model of the sample. Moreover, in some embodiments, the 3D look-up table accounts not only for the change in vertical position as a given path (e.g., corresponding to a single pixel) travels through the sample/vessel, but also for the refraction that occurs, in all three dimensions, at the air/vessel interface and the vessel/sample interface.

The system also determines which pixels in each camera image depict an object or object portion, or a candidate object or object portion. For example, the system may flag any pixel having an intensity over a threshold value as being a pixel in which an object is (or may be) depicted. Based on the flagged pixels for the 2D images of all cameras, and using the 3D look-up table(s) to identify intersections between the optical paths of the various image pixels, the system can assign objects or object portions (or candidate objects/portions) to the appropriate voxels in the 3D image.

Any suitable number of cameras may be positioned at any suitable number of different angles relative to each other and the vessel, with the problems of shape misidentification and ghost particles generally tending to become less frequent as the number of cameras, and especially the number of cameras having different inclination/declination angles, increases. For example, a large number of cameras may be situated at different positions along the periphery of an imaginary sphere that surrounds the vessel (although the cameras need not all be at the same distance from the vessel). In some embodiments, at least the inclined or declined cameras may utilize telecentric lenses, in order to capture the entire sample (or most of the sample) within the depth of field of the lens at moderate inclination/declination angles.

Other inventive techniques, related or potentially related to 3D imaging, are also described herein. For example, to generate an accurate 3D image of a sample, it may be necessary to have pixel-level alignment of the 2D images from the different cameras. If one pixel corresponds to 20 microns in the object plane, for instance, and if a camera lens aperture is placed 180 millimeters (mm) from the object, then even a very slight angular displacement of the lens and camera arm (e.g., due to tolerances in manufacturing of the camera arms) can result in a substantial horizontal or vertical displacement of the imaged object. While the system may be forgiving to variations in the distance between the lens and the imaged object along the optical axis of the camera (e.g., if a telecentric lens is used), and while the effects of perspective as a vessel/sample is tilted towards or away from the camera may in some embodiments be negligible, it remains important to calibrate for vertical and horizontal/lateral displacements in each image, as well as relative rotation around the optical axis.

In addition to imprecision in placement of the cameras, other factors may necessitate calibration of the images. For syringes and cartridges, for instance, parts may be gripped using a spring-loaded chuck, which might allow the vessel to be stably oriented even at a slight offset angle relative to the vertical axis. Moreover, in the case of glass syringes, the forming process of the flange can potentially lead to an uneven flange, which may force the syringe to tilt relative to the vertical axis. For pick-and-place robotic systems, vessels may be gripped around a thin section of their cylindrical body, e.g., by three fingers on the outside of the vessel or two fingers on the inside of the vessel. In either case, the limited number of contact points between the vessel and the gripper may allow the syringe to be held squint and/or precess as the syringe rotates. For vials gripped around the neck, a similar problem may arise. Further, a pharmaceutical vessel (particularly if made from glass) can exhibit deviations in form that may affect the apparent vertical alignment of the cylindrical body of the vessel.

Due to the need for precise (e.g., pixel-level) alignment, digital/software-based calibration may be required regardless of which mechanical techniques are used to handle and present the vessels. It should be appreciated that the above-noted offsets/errors may be small and that, at least in some embodiments, large misalignments may invalidate basic assumptions about the relationship between optical components (e.g., assumptions that certain cameras are orthogonal to the vertical/longitudinal axis of the vessel such that the horizontal plane of the vessel represents a circular cross-section, etc.). Thus, in some embodiments, the digital calibration techniques assume or rely on some prerequisite level of hardware alignment.

Other hardware and/or software techniques may also be used to facilitate 3D imaging of samples in vessels. If particles are tracked in three dimensions based on the constructed 3D images, for example, the system may monitor time-dependent variations in object (e.g., particle) shape, size, and/or position to filter out ghost particles, and/or to identify certain transient shapes (e.g., the disc 102 of FIG. 2) as being incorrect.

BRIEF DESCRIPTION OF THE DRAWINGS

The skilled artisan will understand that the figures described herein are included for purposes of illustration and do not limit the present disclosure. The drawings are not necessarily to scale, and emphasis is instead placed upon illustrating the principles of the present disclosure. It is to be understood that, in some instances, various aspects of the described implementations may be shown exaggerated or enlarged to facilitate an understanding of the described implementations. In the drawings, like reference characters throughout the various drawings generally refer to functionally similar and/or structurally similar components.

DETAILED DESCRIPTION

The various concepts introduced above and discussed in greater detail below may be implemented in any of numerous ways, and the described concepts are not limited to any particular manner of implementation. Examples of implementations are provided for illustrative purposes.

Figure 3:
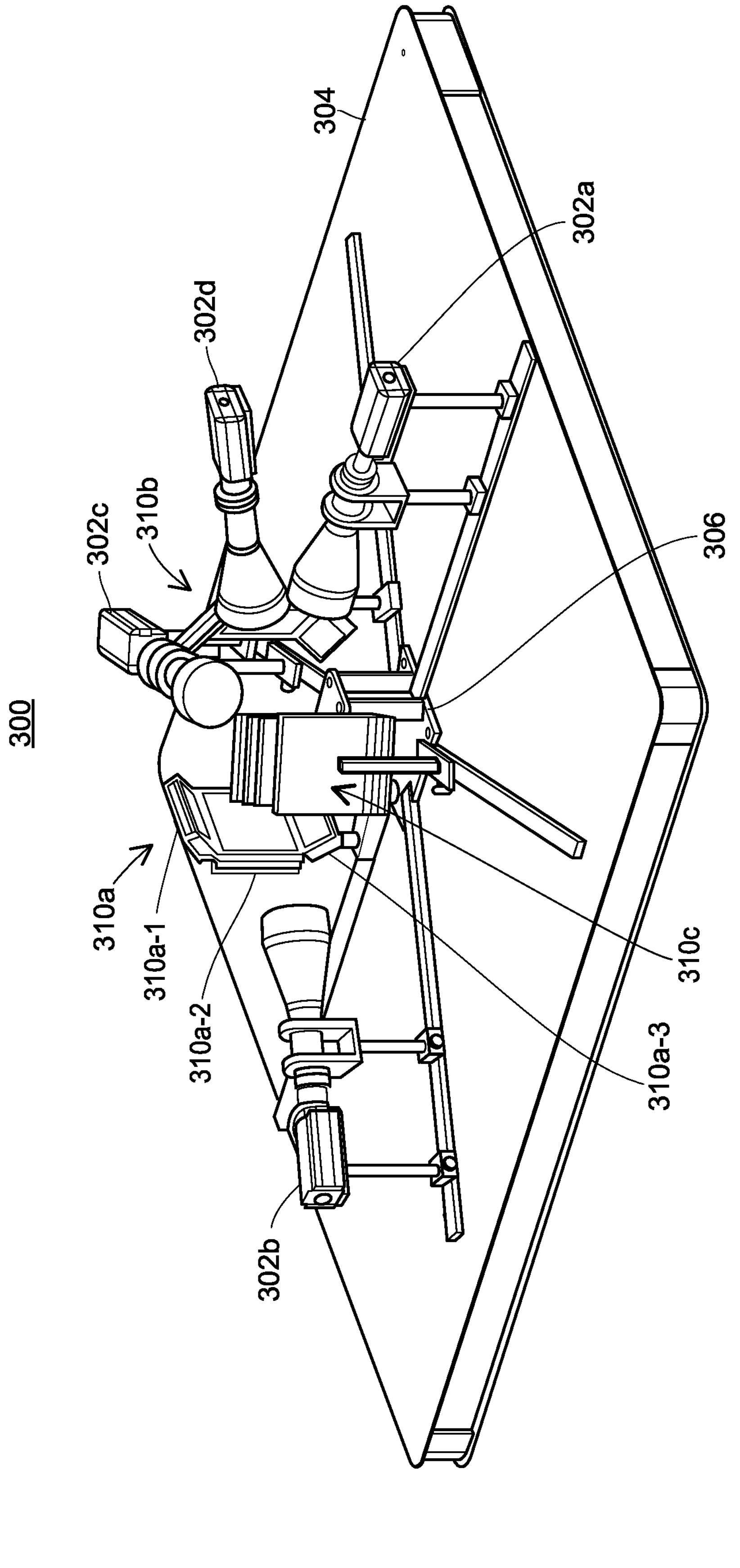
FIG. 3 depicts an example visual inspection system that may be used for the 3D imaging techniques described herein.

FIG. 3 depicts an example visual inspection system 300 that may be used for the 3D imaging techniques described herein. In the depicted embodiment, visual inspection system 300 includes four cameras 302*a* through 302*d* mounted on a platform 304, in a generally radial configuration around (and directed in towards) a sample fixture 306. While not shown in FIG. 3, sample fixture 306 may hold or support a vessel containing a sample. The vessel may be a syringe, a vial, a cartridge, or any other suitable type of container formed from any suitable type or types of material (e.g., glass), with at least a portion of the vessel being transparent or translucent to allow light to pass through the vessel walls and into the sample within the vessel. The sample may be a pharmaceutical drug product in liquid form, for example.

Sample fixture 306 may hold or support the vessel in any suitable manner, alone (e.g., via a spring-loaded chuck) or in combination with another component such as a robotic arm with a grasping component (e.g., two or three robotic fingers that "pinch" the vessel from the outside, or are inserted into the vessel opening and expand outwards). In some embodiments, fixture 306 is associated with a mechanism configured to agitate each sample by rigorously moving the vessel. For example, fixture 306 may include a chuck that is attached to a servo motor. Agitation may cause particles to separate from the vessel sidewalls, and/or elevate from the bottom of the vessel, to facilitate inspection. While 3D imaging may make it unnecessary to agitate for purposes of distinguishing particles from artifacts on the vessel side walls, agitation may still be desired to elevate particles on the vessel bottom, and to enhance tracking and/or characterization of particles based on any observed motion.

Each of cameras 302*a* through 302*d* may include one or more lenses (e.g., a telecentric lens) and an imaging sensor (e.g., a charge-coupled device (CCD) sensor). Cameras 302*a* through 302*d* may all be identical, or may include two or more different types of cameras (e.g., cameras with different lens types). As used herein, the term "camera" may refer to any suitable type of imaging device (e.g., a camera that captures the portion of the frequency spectrum visible to the human eye, or an infrared camera, etc.).

Visual inspection system 300 also includes three light sources 310*a* through 310*c*. Light sources 310*a* through 310*c* may include any suitable type or types of light-generating elements, such as light-emitting diode (LED) arrays, for example. In the example embodiment of FIG. 3, light source 310*a* is aligned with the optical axis of camera 302*a* and on the opposite side of the vessel as camera 302*a*, light source 310*b* is aligned with the optical axis of camera 302*b* and on the opposite side of the vessel as camera 302*b*, and light source 310*c* is aligned with the optical axis of camera 302*c* and on the opposite side of the vessel as camera 302*c*. Light source 310*a* is also generally opposite to camera 302*d*.

As seen in FIG. 3, each of light sources 310*a* through 310*c* may include three components. Referring specifically to light source 310*a* for illustration, light source 310*a* includes a rectangular top portion 310*a*-1 that is angled downward, a relatively large middle portion 310*a*-2 that is orthogonal to the optical axis of the opposing camera 302*a*, and a rectangular bottom portion 310*a*-3 that is angled upward. While not labeled in FIG. 3, light sources 310*b* and 310*c* may have the same three-part configuration as light source 310*a*. In one example embodiment, the top and bottom portions of each of light sources 310*a* through 310*c* are CCS LDL2-74X30RD bar LEDs. In various embodiments, some or all of light sources 310*a* through 310*c* may have other components, shapes, sizes, and/or configurations rather than what is shown in FIG. 3. Moreover, any suitable type of lighting may be used (e.g., laser-based illumination).

In some embodiments, each of light sources 310*a* through 310*c* may be controlled so as to selectively activate the middle portion (e.g., for backlighting, as discussed below in connection with calibration procedures), or to instead activate the top and bottom portions (e.g., when capturing 2D images for 3D particle imaging and tracking). With reference to light source 310*a*, for example, middle portion 310*a*-2 may be activated (and portions 310*a*-1, 310*a*-3 deactivated) to provide backlighting when using camera 302*a* to capture a 2D calibration image, whereas portions 310*a*-1, 310*a*-3 may be activated (and portion 310*a*-2 deactivate) when using cameras 302*a* through 302*d* to capture 2D images for particle 3D imaging and tracking.

Figure 1A:
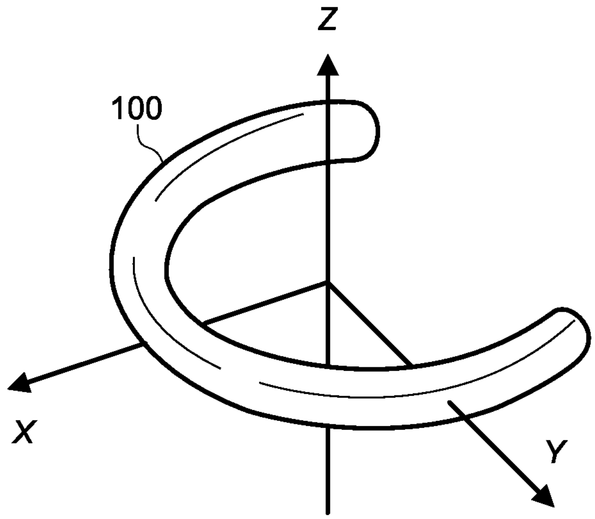
FIGS. 1A and 1B depict an example of actual and apparent particle shapes, respectively, for a particle imaging system in which all cameras have optical axes in the same plane.
Figure 1B:
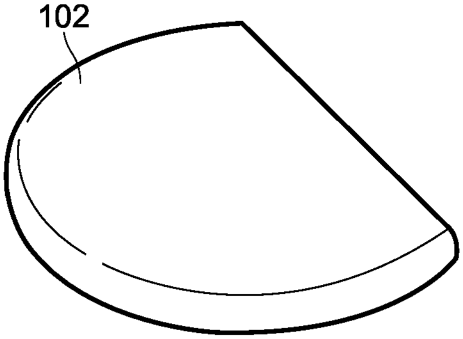
Figure 2:
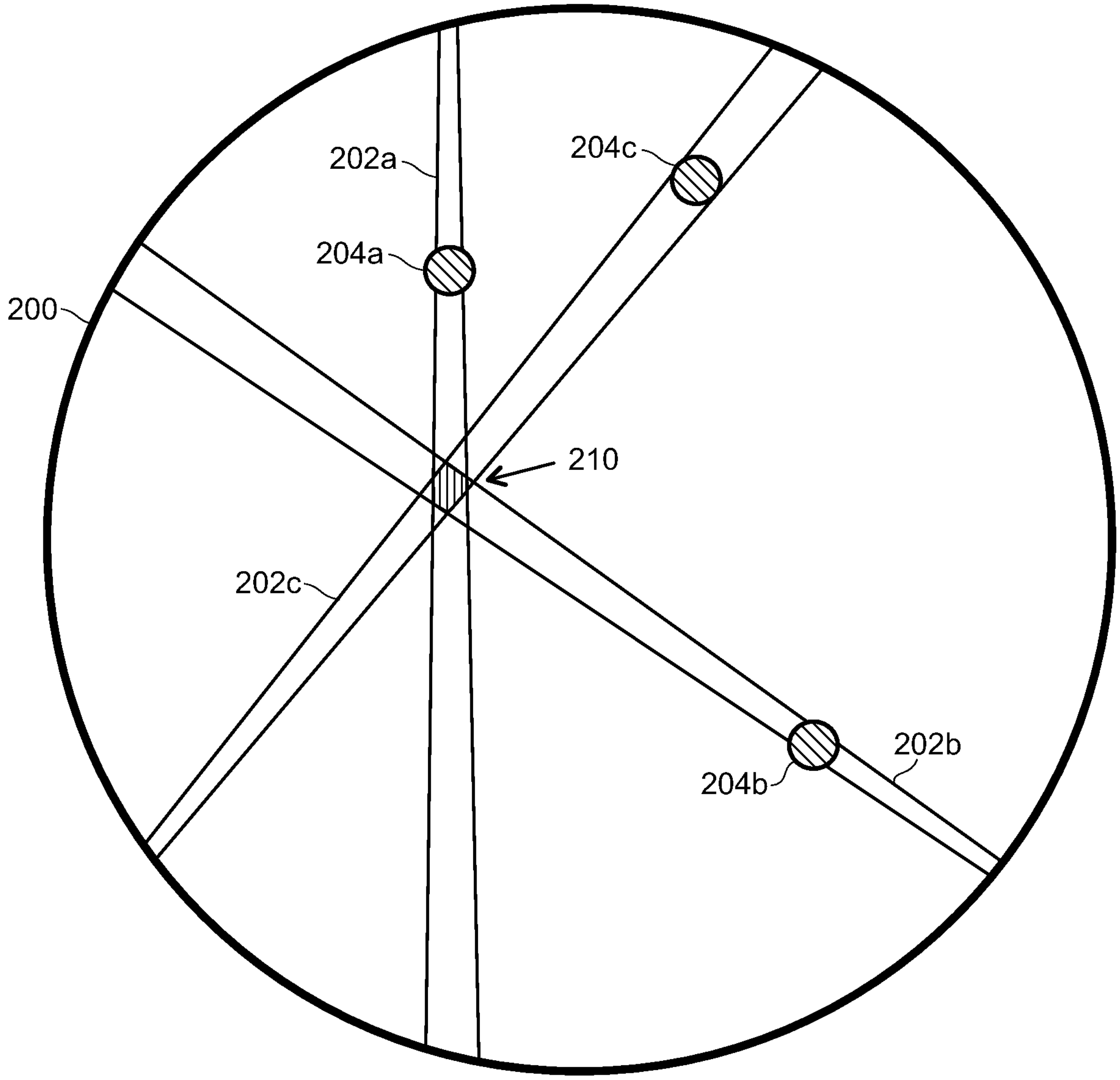
FIG. 2 depicts a top-down, cross-sectional view of a vessel in an example scenario where a "ghost particle" is detected.

In the depicted embodiment, cameras 302*a* through 302*c* are aligned such that the optical axis of each falls within the horizontal plane, and passes through the vessel. As used herein, the term "horizontal plane" refers to a plane that is orthogonal to the longitudinal/vertical axis of the vessel being imaged, and passes through the vessel. For example, any plane that is parallel to platform 304, and at a distance above platform 304 that causes the plane to pass through the vessel held by fixture 306, may be considered the horizontal plane. Camera 302*d*, however, is positioned such that its optical axis is declined (aimed downward) relative to the optical axes of the other cameras 302*a* through 302*c*, and relative to the horizontal plane, while still passing through the vessel. In an alternative embodiment, camera 302*d* may be positioned lower (i.e., closer to platform 304), and angled upward such that its optical axis is inclined relative to the other optical axes and the horizontal plane. Camera 302*d* may be declined or inclined at an angle sufficiently large to reduce the probability of misidentified shapes, as discussed above in connection with FIGS. 1A and 1B. For example, camera 302*d* may be oriented such that its optical axis is inclined or declined (relative to the horizontal plane) at least 5 degrees relative to the optical axes of other cameras (e.g., some suitable value between 10 degrees and 80 degrees, or between 15 and 25 degrees, etc.). Other considerations involving the angle of inclination/declination are discussed below in connection with FIG. 5. By providing an additional perspective (beyond that of cameras 302*a* through 302*b*), camera 302*d* also lowers the probability that a "ghost particle" will be detected, as discussed above in connection with FIG. 2.

In alternative embodiments, visual inspection system 300 may include additional components, fewer components, and/or different components, and/or the components may be configured/arranged differently than shown in FIG. 3. In one alternative embodiment, for example, visual inspection system 300 includes an additional light source opposite to (and aligned with the optical axis of) camera 302*d*. As another example, visual inspection system 300 may include one or more additional cameras at one or more angles of inclination/declination, and/or at different positions around the perimeter of the vessel. As yet another example, visual inspection system 300 may omit one of cameras 302*a* through 302*c*, and/or one or more of cameras 302*a* through 302*c* may be inclined or declined relative to the horizontal plane of the vessel. As still another example, visual inspection system 300 may include ring LED lights both above and below the sample (e.g., continuous LED ring lights that each have a ring diameter substantially greater than the diameter of the vessel, and with each ring being positioned in a plane that is orthogonal to the longitudinal axis of the vessel).

Each of cameras 302*a* through 302*d* is configured to capture 2D images, with each such image including a number of vertically-stacked rows of pixels. Each pixel is associated with an intensity level, which may be, for example, a monochrome intensity, or a combination of red, green, and blue (RGB) values, etc. Generally, for the portion of a given 2D image that represents the sample in the vessel, a higher pixel intensity value may be indicative of the presence of an object (e.g., a particle or bubble).

Each pixel of a given 2D image is also associated with a particular optical path. That is, for a given pixel, any object that is within the associated optical path, and neither out of range nor transparent, should affect the intensity value(s) for that pixel. FIGS. 4A through 4D depict example optical paths for a single row of pixels, as light traverses a vessel 400 and sample 402. Vessel 400 may be held or otherwise supported by fixture 306 of FIG. 3, for example. It is understood that, in some embodiments, optical modeling techniques other than ray optics may be used. For example, some embodiments may use models comprising calculated electromagnetic fields that account for the wave nature of light (e.g., using the finite-difference time-domain (FDTD) method).

Figure 4A:
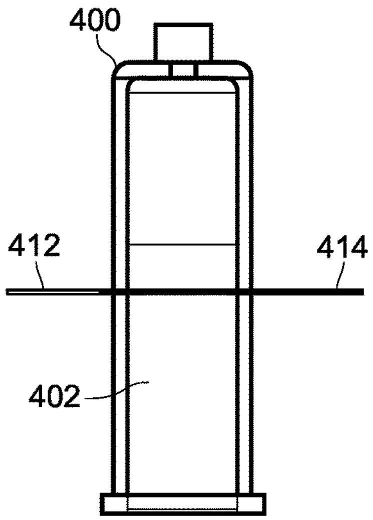
FIGS. 4A through 4D depict example optical paths, for each pixel of a single row of pixel sensors of a camera, as light traverses a vessel containing a sample.

Referring first to FIG. 4A, a sensor element 412 represents a portion of the sensor (e.g., CCD sensor) for any one of cameras 302*a* through 302*c* in the horizontal plane of FIG. 3, where the sensor element 412 collects the information used to generate a single pixel row of the 2D image generated by that camera. Optical paths 414 correspond to the ray optics for the various pixels in the pixel row, with optical paths 414 being depicted as a single line merely because FIG. 4A represents a side view (i.e., with each path being in a horizontal plane that is orthogonal to the plane of the cross-section depicted in FIG. 4A). As seen in FIG. 4A, the optical paths 414 do not change in elevation relative to vessel 400. However, optical paths 414 do change direction within the horizontal plane, due to refraction at the air-vessel and vessel-sample interfaces (each occurring upon both entry and exit). These changes in direction in the horizontal plane may be somewhat similar to what is depicted in FIG. 4D, discussed below.

Figure 4B:
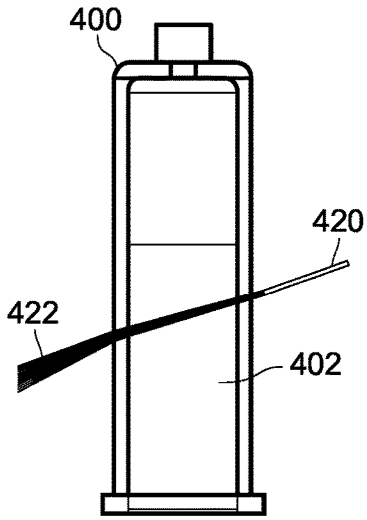

Turning now to FIG. 4B, a sensor element 420 represents a portion of the sensor (e.g., CCD sensor) for camera 302*d* of FIG. 3, where the sensor element 420 collects the information used to generate a single pixel row of the 2D image generated by camera 302*d*. Optical paths 422 correspond to the ray optics for the various pixels in the pixel row. As seen in FIG. 4B, due to the declined angle of camera 302*d* (and thus, sensor element 420), the optical paths 422 change in elevation relative to vessel 400 as distance from sensor element 420 increases. Moreover, as can also be seen in FIG. 4B, the declined angle causes optical paths 422 to spread/broaden in the longitudinal/vertical direction as the distance from sensor element 420 increases.

Figure 4C:
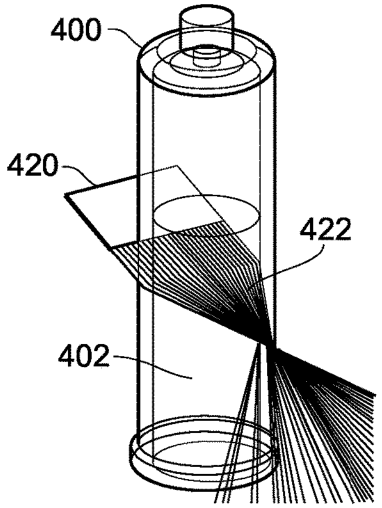
Figure 4D:
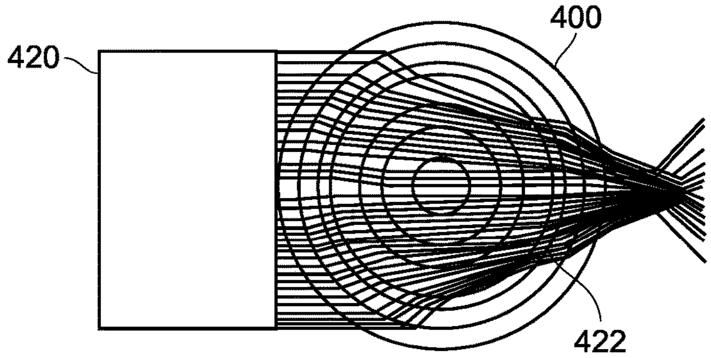

FIG. 4C provides a different perspective of the optical paths 422 associated with sensor element 420, in order to better show both the declined angle and the horizontal changes of direction (i.e., relative to the x- and y-axes, if the longitudinal axis of vessel 400 is viewed as the z-axis). For greater clarity, FIG. 4D provides still another (top-down) perspective of optical paths 422. Changes of direction along the x- and y-axes may be similar (though probably not identical) to the changes of direction for optical paths 414 of FIG. 4A.

The pixel-specific optical paths may be computed for cameras 302*a* through 302*c* (e.g., three sets of path each identical or similar to optical paths 414), and for camera 302*d* (e.g., optical paths 422), based on the shape (e.g., curvature/dimensions) of vessel 400, the refractive index of air (or any other gas surrounding vessel 400), the refractive index of the walls of vessel 400, the refractive index of sample 402, and the optical properties of the lens being used. Alternatively, the optical paths may be determined by empirical measurements (e.g., by moving a thin needle to different positions in a test sample). Once computed or otherwise determined, the ray optics models represented by these sets of optical paths (or portions of those paths) may be stored in one or more look-up tables that collectively map each pixel of each 2D image (i.e., each pixel of any image generated by one of cameras 302*a* through 302*d*) to a set of positions in physical space, as will be discussed further below in connection with FIG. 6.

There are a number of competing concerns with respect to the optimal angle for camera 302*d*, and/or any other camera (s) that may be inclined or declined with respect to the horizontal plane of the vessel. For example, it may generally be desirable to have a larger angle from the horizontal plane in order to provide a sufficiently different perspective and ameliorate the problem described above in connection with FIGS. 1A and 1B. On the other hand, a very large angle may result in very substantial distortion and/or occlusion due to fixtures (e.g., fixture 306 or a robotic arm), the meniscus of sample 402, the bottom of the vessel, and/or other factors.

Figure 5:
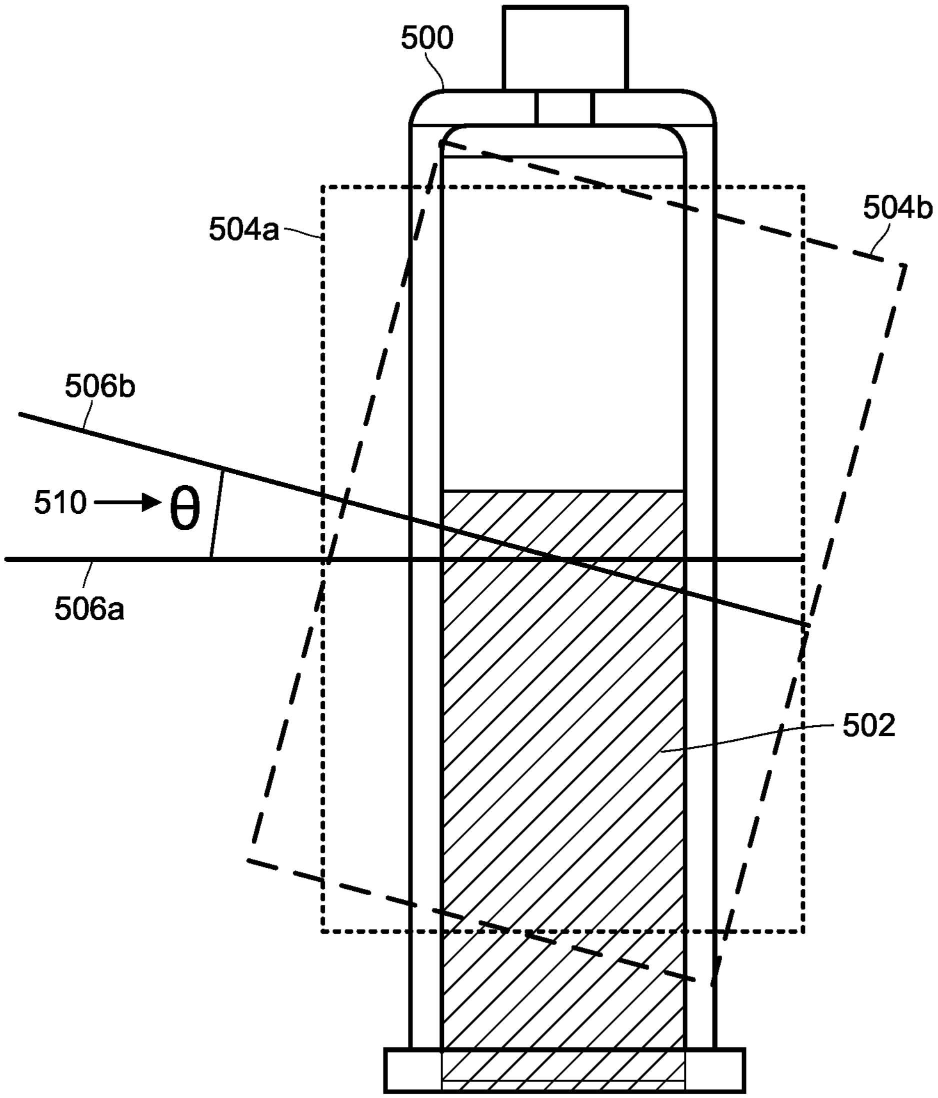
FIG. 5 depicts an example field depth for a telecentric lens of a camera, relative to a vessel, as the camera is angled relative to a horizontal plane of the vessel.

The inclination/declination angle may also be restricted by the depth of field of the camera lens, and the need to capture all (or most of) sample 402 in each 2D image. FIG. 5 helps illustrate this latter concern, in the specific case where the inclined/declined camera has a telecentric lens. As seen in FIG. 5, a vessel 500 that contains a sample 502 (e.g., vessel 400 and sample 402, respectively, of FIGS. 4A through 4D) is imaged by a camera that is not depicted in FIG. 5 (e.g., one of cameras 302*a* through 302*d*).

In one example, vessel 500 may be a 1 mL glass syringe in which sample 502 is a fluid with a height of about 40 mm. The telecentric lens (e.g., an Edmund 55575 0.16× lens) may have a field depth of about 20 mm, for example. Advantageously, a telecentric lens may avoid problems associated with perspective or defocus through the volume of sample 502. In the case where the optical axis of the camera is aligned with the horizontal plane, therefore, the entire volume may be imaged. In FIG. 5, area 504*a* represents the field depth for the telecentric lens when the camera is arranged to have optical axis 506*a* in the horizontal plane. When the angle of inclination or declination increases however, the area corresponding to the field depth may not include the entire sample 502. As seen in FIG. 5, for example, optical axis 506*b* (i.e., with the camera declined at an angle 510 relative to the horizontal plane) results in a field depth covering an area 504*b*, with more of the bottom portion of sample 502 not being imaged. In other embodiments, the field may cover a larger vertical dimension/height, to ensure that the entire sample 502 is imaged even as angle 510 increases. However, it may still be desirable to limit angle 510 to avoid excessive distortion or occlusion from the top or bottom of vessel 500, etc. As just one example, an angle 510 of 20 degrees may be suitable for imaging sample 502. In other embodiments or scenarios, other suitable angles may be used (e.g., any angle between 5 and 90 degrees, between 10 and 80 degrees, between 15 and 25 degrees, etc.). For an angle 510 that is substantially larger than 20 degrees, a different (non-telecentric) lens type may be more suitable.

Figure 6:
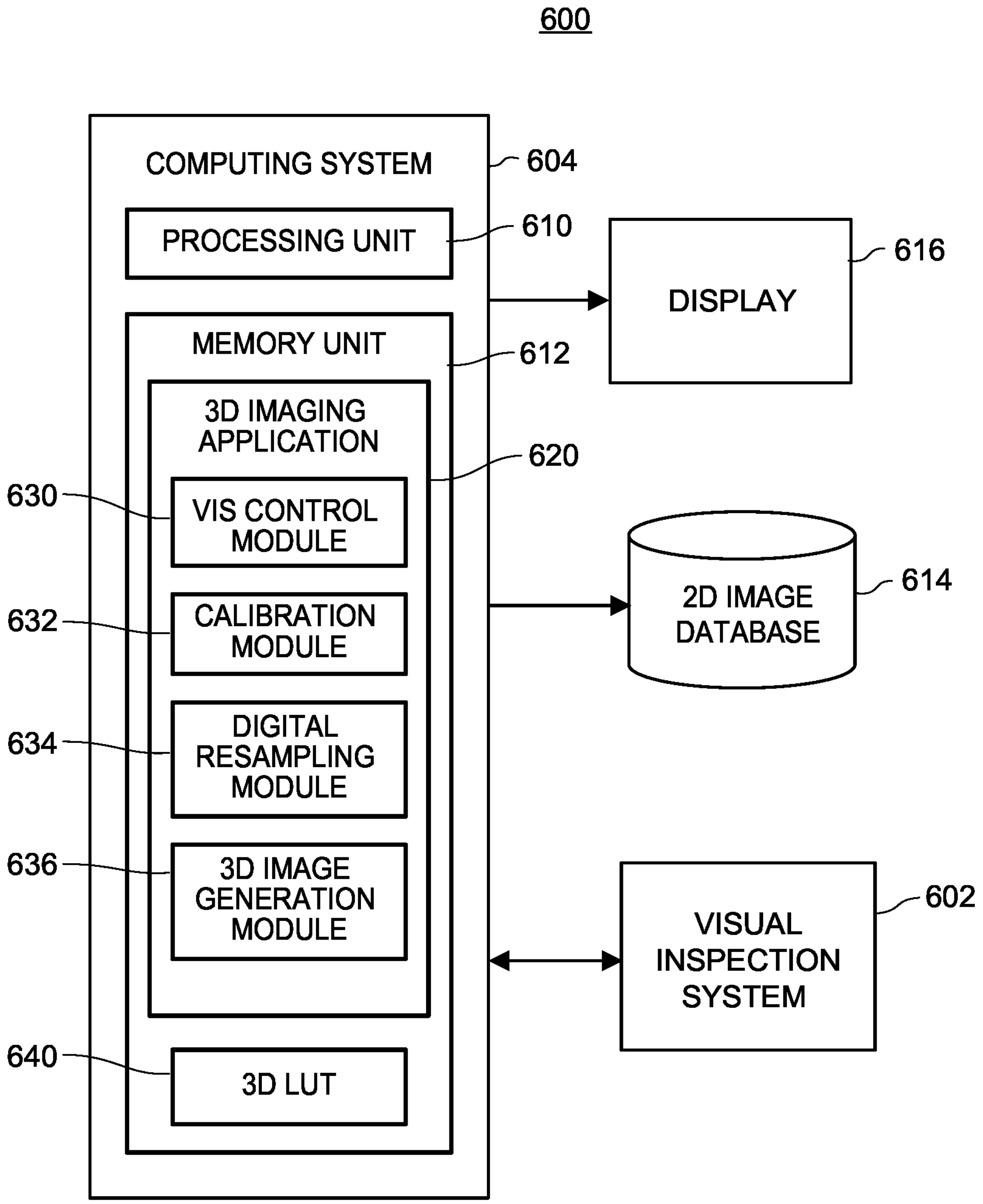
FIG. 6 is a simplified block diagram of an example system that may implement the techniques described herein.

FIG. 6 is a simplified block diagram of an example system 600 that may implement the 3D imaging techniques described herein. System 600 includes a visual inspection system 602 communicatively coupled to a computing system 604. Visual inspection system 602 includes hardware (e.g., a stage or platform, three or more cameras, etc.), as well as firmware and/or software, that is configured to capture digital 2D images of a sample within a vessel. Visual inspection system 602 may be visual inspection system 300 of FIG. 3, for example. While FIG. 6 depicts, and is primarily described herein with reference to, an embodiment in which visual inspection system 602 is controlled by computing system 604, it is understood that, in other embodiments, visual inspection system 602 may purely (or primarily) implement local control (e.g., if visual inspection system 602 includes components that provide local processing to generate 3D images).

Visual inspection system 602 may image each of a number of vessels/samples sequentially. To this end, visual inspection system 602 may include, or operate in conjunction with, a robotic arm or other component that successively moves each vessel/sample into an appropriate position for imaging (e.g., on fixture 306 of FIG. 3), and then moves the vessel/sample away once imaging of that vessel/sample is complete. While not shown in FIG. 6, visual inspection system 602 may include a communication interface and processors to enable communication with computing system 604.

Computing system 604 may generally be configured to control/automate the operation of visual inspection system 602, and to receive and process images captured/generated by visual inspection system 602, as discussed further below. Computing system 604 is also coupled to (or includes) a display 616, via which computing system 604 may render visual information to a user. Computing system 604 may be a general-purpose computer that is specifically programmed to perform the operations discussed herein, or may be a special-purpose computing device. As seen in FIG. 6, computing system 604 includes a processing unit 610 and a memory unit 612. In some embodiments, however, computing system 604 includes two or more computers that are either co-located or remote from each other. In these distributed embodiments, the operations described herein relating to processing unit 610 and memory unit 612 may be divided among multiple processing units and/or memory units, respectively.

Processing unit 610 includes one or more processors, each of which may be a programmable microprocessor that executes software instructions stored in memory 612 to execute some or all of the functions of computing system 604 as described herein. Processing unit 610 may include one or more graphics processing units (GPUs) and/or one or more central processing units (CPUs), for example. Alternatively, or in addition, some of the processors in processing unit 610 may be other types of processors (e.g., application-specific integrated circuits (ASICs), field-programmable gate arrays (FPGAs), etc.), and some of the functionality of computing system 604 as described herein may instead be implemented in hardware. Memory unit 612 may include one or more volatile and/or non-volatile memories. Any suitable memory type or types may be included in memory unit 612, such as read-only memory (ROM), random access memory (RAM), flash memory, a solid-state drive (SSD), a hard disk drive (HDD), and so on. Collectively, memory unit 612 may store one or more software applications, the data received/used by those applications, and the data output/generated by those applications.

Memory unit 612 stores the software instructions of a 3D imaging application 620 that, when executed by processing unit 610, processes 2D images captured by visual inspection system 602 to generate 3D images/models of samples within vessels (and possibly the vessels themselves). While various modules of application 620 are discussed below, it is understood that those modules may be distributed among different software applications, and/or that the functionality of any one such module may be divided among different software applications.

In some embodiments, a visual inspection system (VIS) control module 630 of application 620 controls/automates operation of visual inspection system 602 such that 2D images of samples can be generated with little or no human interaction. VIS control module 630 may cause a given camera to capture a 2D image by sending a command or other electronic signal (e.g., generating a pulse on a control line, etc.) to that camera. Visual inspection system 602 may send the captured 2D images to computing system 604, and application 620 (or another application stored in memory unit 612 and executed by processing unit 610) may store the received images in a 2D image database 614 for local processing. Database 614 may be stored in memory unit 612, or may be stored in another remote or local memory (e.g., a solid state or hard disk drive memory) not shown in FIG. 6, for example. As noted above, however, visual inspection system 602 may be locally controlled, in certain alternative embodiments, in which case VIS control module 630 may have less functionality than is described herein (e.g., only handling the retrieval of images from visual inspection system 602), or may be omitted entirely from application 620.

In some embodiments, VIS control module 630 causes visual inspection system 602 to perform certain calibration-related procedures, such as capturing 2D calibration images, and a calibration module 632 of application 620 processes the calibration images to generate calibration data (e.g., correction factors, matrices, etc.). Thereafter, a digital resampling module 634 of application 620 pre-processes the 2D images captured by visual inspection system 602, using the calibration data generated by calibration module 632, to spatially normalize/align the 2D images from the different cameras (e.g., with pixel-level precision). A 3D image generation module 636 of application 620 then processes the resampled 2D images, using a 3D look-up table (LUT) 640 stored in memory unit 612 (or another suitable local or remote memory) to construct a 3D image/model of each sample. While referred to herein in the singular, it is understood that 3D look-up table 640 may consist of two or more separate look-up tables (e.g., one per camera). Depending on the embodiment (e.g., whether different camera lenses are used, whether the cameras have different angles of inclination relative to the vessel, whether the vessel is symmetric about its longitudinal axis, etc.), different look-up tables may be used for different cameras, the same look-up table may be reused across different cameras, or some combination thereof (e.g., in FIG. 3, a first look-up table for each of cameras 302*a* through 302*c*, and a different, second look-up table for camera 302*d*). The potential to use different look-up tables for different cameras allows flexible configurations of cameras and lenses within the same setup, so long as the correct look-up tables are calculated and addressed during operation. After the 3D image/model is constructed, application 620, or another application executing on computing system 604, may process the 3D image, and/or other 3D images generated in a similar manner at different times, to perform operations such as particle detection, sizing, counting, classification, and/or tracking. The operation of modules 630 through 636 are discussed in further detail below.

Operation of system 600, according to some embodiments, will now be described with reference to FIGS. 3 through 5, and with reference to a particular embodiment in which computing system 604 controls visual inspection system 602. Initially, in this embodiment, VIS control module 630 causes (e.g., instructs or triggers) visual inspection system 602 to implement a calibration data collection procedure, for purposes of generating calibration data (e.g., correction factors/matrices) that will be used to align the 2D images captured by visual inspection system 602 during the inspection process. In some embodiments, this calibration procedure is intended to correct only small shifts and/or rotations, to achieve pixel-level or near pixel-level alignment, and it is assumed that the mechanical alignment of all cameras is reasonably precise to initially provide coarse alignment. In this calibration procedure, VIS control module 630 causes the cameras of visual inspection system 602 (e.g., cameras 302*a* through 302*d*) to sequentially capture respective 2D images of the vessel under backlit conditions. The vessel (e.g., held or supported by fixture 306) may be empty or filled with a sample (e.g., a liquid drug product). In some embodiments, for example, calibration procedures are repeated for each new vessel/sample, in which case a sample will be present in the vessel during each iteration thereof.

Backlighting the vessel advantageously causes vessel edges in each image to appear in high contrast with the bright background. To achieve the backlit conditions, VIS control module 630 may activate and deactivate light sources in an ordered sequence. With reference to the embodiment of FIG. 3, for example, VIS control module 630 may first activate only the middle element 310*a*-2 of light source 310*a* (and no other light sources/elements) while causing camera 302*a* to capture a first calibration image, then activate only the middle element of light source 310*b* (and no other light sources/elements) while causing camera 302*b* to capture a second calibration image, and then activate only the middle element of light source 310*c* (and no other light sources/elements) while causing camera 302*c* to capture a third calibration image. In one embodiment, VIS control module 630 also causes camera 302*d* to capture an image while only element 310*a*-2 is activated. Alternatively, VIS control module 630 may cause camera 302*d* to capture an image while only element 310*a*-3 is activated, if element 310*a*-3 is of sufficient size/intensity to backlight the vessel from the perspective of camera 302*d*.

Calibration module 632 processes each of the 2D calibration images from the various cameras to determine at least a horizontal offset of the image, a vertical offset of the image, and a rotation of the image. If the width and height of a given image are measured along an x-axis and y-axis, respectively, the rotation may be the rotation along the z-axis (i.e., the axis orthogonal to the image), for example. In one embodiment, calibration module 632 determines the offsets and rotation for each calibration image by using an edge detection image processing technique (e.g., a search based or zero-crossing based method), and then comparing the locations of the detected edges to expected edge locations (e.g., for a hypothetical vessel that is perfectly situated). In other embodiments, calibration module 632 compares the locations of the detected edges to the locations of edges detected in a different one of the calibration images, which is used as a reference image. For example, calibration module 632 may compare the locations of edges detected in the calibration images obtained by cameras 302*b* through 302*d* with the locations of the edges detected in the calibration image obtained by camera 302*a*. Calibration module 632 may store the calibration data for each camera in memory unit 612 or another suitable location.

Figure 7A:
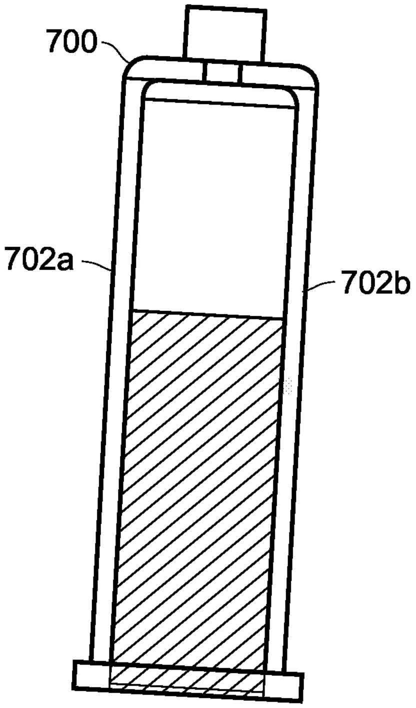
FIGS. 7A and 7B depict an example calibration technique using edge detection.
Figure 7B:
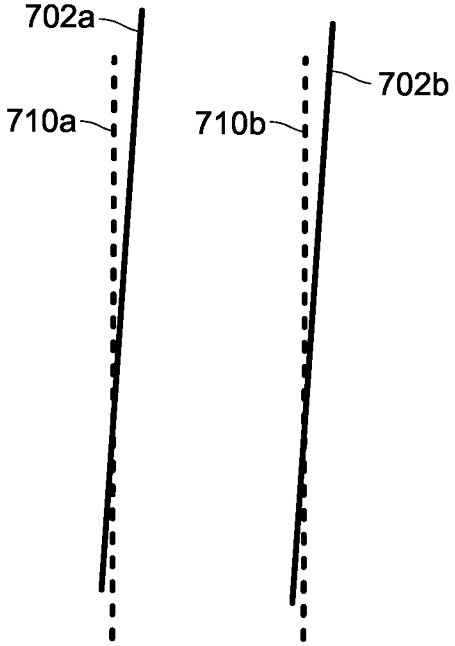

FIGS. 7A and 7B depict an example of how calibration module 632 may determine offsets and rotation using edge detection. In some embodiments, as noted above, the calibration procedure is only intended to correct for small misalignments. In FIGS. 7A and 7B, however, a relatively large degree of misalignment is shown for purposes of clarity. Referring first to FIG. 7A, a vessel 700 (e.g., vessel 400 or 500, held or supported by fixture 306), with a wall having left and right edges (from the perspective of the camera) 702*a* and 702*b*, is imaged by a camera. FIG. 7A may represent a 2D image generated by one of cameras 302*a* through 302*c*, for example. Referring next to FIG. 7B, calibration module 632 may detect the edges and output data indicative of the positions of edges 702*a* and 702*b* (e.g., relative to the center, corner, edge, or other portion of the entire 2D image). In FIG. 7B, edges 710*a* and 710*b* may represent expected edge locations (e.g., as stored in memory unit 612), or may represent edge locations in a reference image of the same vessel as discussed above.

In the depicted scenario, edges 702*a* and 702*b* are positively offset from edges 710*a* and 710*b* along both the x-axis and y-axis (i.e., towards the right side, and towards the top, of FIG. 7B), and are rotated by about 10 degrees around the z-axis, relative to edges 710*a* and 710*b*. Calibration module 632 may compute the precise offsets and rotation, and use those values to compute calibration data for the camera that captured the calibration image shown in FIG. 7A. For example, the calibration data for images captured by that specific camera may include a matrix that, when operating upon the matrix form of any 2D image captured by the same camera, would "undo" the x- and y-axis offsets (by shifting left and down by the measured amounts) as well as the z-axis rotation (by rotating counter-clockwise roughly 10 degrees).

Because images captured by an inclined or declined camera (e.g., camera 302*d*) are "tilted" relative to the horizontal plane of the vessel, the vessel may appear longer or shorter in the corresponding calibration image. However, the 3D imaging process may be relatively insensitive to tilt in that direction (i.e., around the x-axis), and the above techniques may still generally be used. For tilted cameras, for example, calibration module 632 may account for the different expected top and bottom positions for both the left and the right edge of the vessel (e.g., by using modified versions of edges 710*a* and 710*b* when computing x- and y-axis offsets).

In some embodiments, calibration module 632 (or another module or application) also facilitates a validation stage at which it is determined whether the calibration data generated for the various cameras properly aligns the images. In one such embodiment where images of three cameras are calibrated (e.g., cameras 302*a* through 302*c*), a monochrome calibration image from each camera is input to each color channel (i.e., red, green and blue channels) of a composite RGB image. If the images are properly aligned, any non-transparent objects within the composite RGB image (including portions of the vessel, possibly) should appear white. In one embodiment, calibration module 632 causes the composite RGB image to be presented via a user interface shown on display 616, such that a human user can quickly confirm whether proper alignment has been achieved. Alternatively, calibration module 632 may process the composite RGB image to detect any red, blue, and/or green areas, and determine whether proper alignment has been achieved based on those areas (if any). For example, calibration module 632 may determine that the calibration procedure failed when detecting more than a threshold number of single- or two-colored pixels (possibly excluding areas where particles may reside in a sample). Calibration module 632 may then cause a user interface on display 616 to indicate whether calibration was successful, and/or initiate some other action.

After calibration module 632 generates and stores the calibration data for all cameras (or for all cameras except one, if one camera is used for a reference image), VIS control module 630 commences the 3D imaging process by causing each of the cameras to capture one or more 2D images (e.g., a time sequence of 2D images) of the sample. If particle tracking is employed, VIS control module 630 may trigger a time-series of 2D images for each camera with a time interval that is small enough to permit the tracking of relatively fast-moving particles. At any given time step, in at least some embodiments (e.g., for lower-viscosity liquid samples), it is critical that the 2D images from the various cameras be synchronized in time, such that any particles, bubbles, or other objects within a sample cannot move appreciably between the image capture times of the different cameras. To this end, in some embodiments, computing system 604 and/or visual inspection system 602 may include software, firmware and/or hardware to synchronize the capturing of the 2D images. Example synchronization techniques are discussed in more detail below, with reference to FIG. 8.

At a given time step, once VIS control module 630 has caused the three or more cameras (e.g., cameras 302*a* through 302*d*) to capture and provide respective, synchronized 2D images of the vessel/sample, digital resampling module 634 applies the appropriate portion of the stored calibration data to each image. As discussed above, for example, application of calibration data may involve performing a matrix operation on a given image, to correct for x- and y-axis offset and rotation around the z-axis.

Next, 3D image generation module 636 processes the synchronized and calibrated/resampled 2D images to construct a single 3D model/image for the time step. To do so, 3D image generation module 636 accesses 3D look-up table 640, and determines which pixels in a given 2D image map to which positions in physical 3D space. For example, 3D look-up table 640 may map each pixel of each 2D image to a set of voxels within a 3D voxel grid that encompasses the occupied by the sample. Referring back to FIG. 4, for example, look-up table 640 may map the pixels of the pixel row generated by sensor element 412 to the voxels that fall within (or overlap, etc.) the optical paths 414, and map the pixels of the pixel row generated by sensor element 420 to the voxels that fall within (or overlap, etc.) the optical paths 422. The optical path for each pixel may have been determined (when 3D look-up table 640 was pre-calculated) based on empirical measurements and/or computations that account for parameters/factors such as vessel shape, refractive index of the sample, refractive index of the vessel, refractive index of the air (or other surrounding gas), and/or optical properties of the lens being used. In some embodiments, the height of each voxel in the 3D grid (e.g., the voxel dimension along the longitudinal axis of vessel 400) corresponds to the height of each pixel produced by sensor element 412. For example, each pixel height may represent a longitudinal distance of 20 microns, and each voxel may represent a cube in physical space that is 20 microns high, wide, and deep (although other voxel shapes, such as rectangles, are also possible).

3D image generation module 636 uses the knowledge of which 2D image pixels map to which voxels in the 3D grid, for each of the multiple cameras/perspectives, to constrain the imaged objects or object portions (e.g., pixels with above-threshold intensities) to specific positions within the 3D grid. In particular, 3D image generation module 636 may populate the voxels of the 3D model/image (e.g., assign an object or object portion to specific voxels) based on (1) which pixels of the various 2D images depict an object or object portion, and (2) the intersection points of the optical paths (ray optics) corresponding to the pixels of the different cameras as indicated by 3D look-up table 640. In one such embodiment, 3D image generation module 636 only determines that a given voxel of the 3D image contains an object or object portion if all of the pixels (or, at least some threshold number of pixels) having optical paths that pass through that voxel depict an object or object portion (e.g., have at least a threshold pixel intensity level). This processing may be rather complex, particularly due to the changes in elevation of optical paths for the tilted camera(s), and due to the vertical spreading of the optical paths for the tilted camera(s). Nonetheless, so long as (1) the 3D look-up table 640 accurately represents those elevation changes and vertical spreading, (2) enough cameras with different perspectives are used to capture the synchronized 2D images, and (3) the 2D images are precisely calibrated (e.g., to pixel-level alignment), 3D image generation module 636 can accurately reconstruct the sample volume as a 3D image.

In embodiments where particle sizes, classifications, and/or counts are needed, and/or where particle tracking is performed, it may be necessary to determine which "populated" voxels (i.e., which of the voxels determined to correspond to at least a portion of an object) belong to the same objects (e.g., the same bubble or particles). Moreover, in some embodiments, clustering may be used to reduce "noise" in the 3D image, by considering the populated voxels of the pre-clustered 3D model as mere "candidate" objects or object portions. For reasons such as these, after 3D image generation module 636 constructs the populated 3D voxel grid from the 2D images, 3D image generation module 636 (or another module or application) may group adjacent populated voxels together to form voxel clusters corresponding to real-world objects in the sample. Efficient processing techniques may be highly desirable in this regard, as the 3D voxel grid may be large. If the vessel is a 5 mL cartridge, for example, the raw 3D image may correspond to 710×710×1050 pixels, or about 529 million voxels, and an 8-bit representation of this array would require 0.5 GB of RAM per 3D frame (i.e., per time step). Fortunately, for low particle densities, this dataset can be simplified substantially using clustering. In one embodiment, 3D image generation module 636 uses a k-means clustering approach. Alternatively, 3D image generation module 636 may use a "brute force" approach such as a DBSCAN algorithm, a voxel-specific approach (e.g., the CONNECT algorithm or a variation thereof), or any other suitable clustering technique.

Once the populated voxels are clustered into discrete objects, application 620 may determine sizes of those objects, and/or classes/types of those objects (e.g., "particle" versus "bubble," or possibly more refined categories such as "fiber," etc.). Moreover, application 620 may use the shapes, sizes and/or classes of objects identified in multiple 3D images generated over time, in order to more accurately track those objects. As noted above, the tracking algorithms may be greatly simplified, and/or far more accurate, as compared to tracking based on 2D images without any 3D reconstruction.

Figure 8:
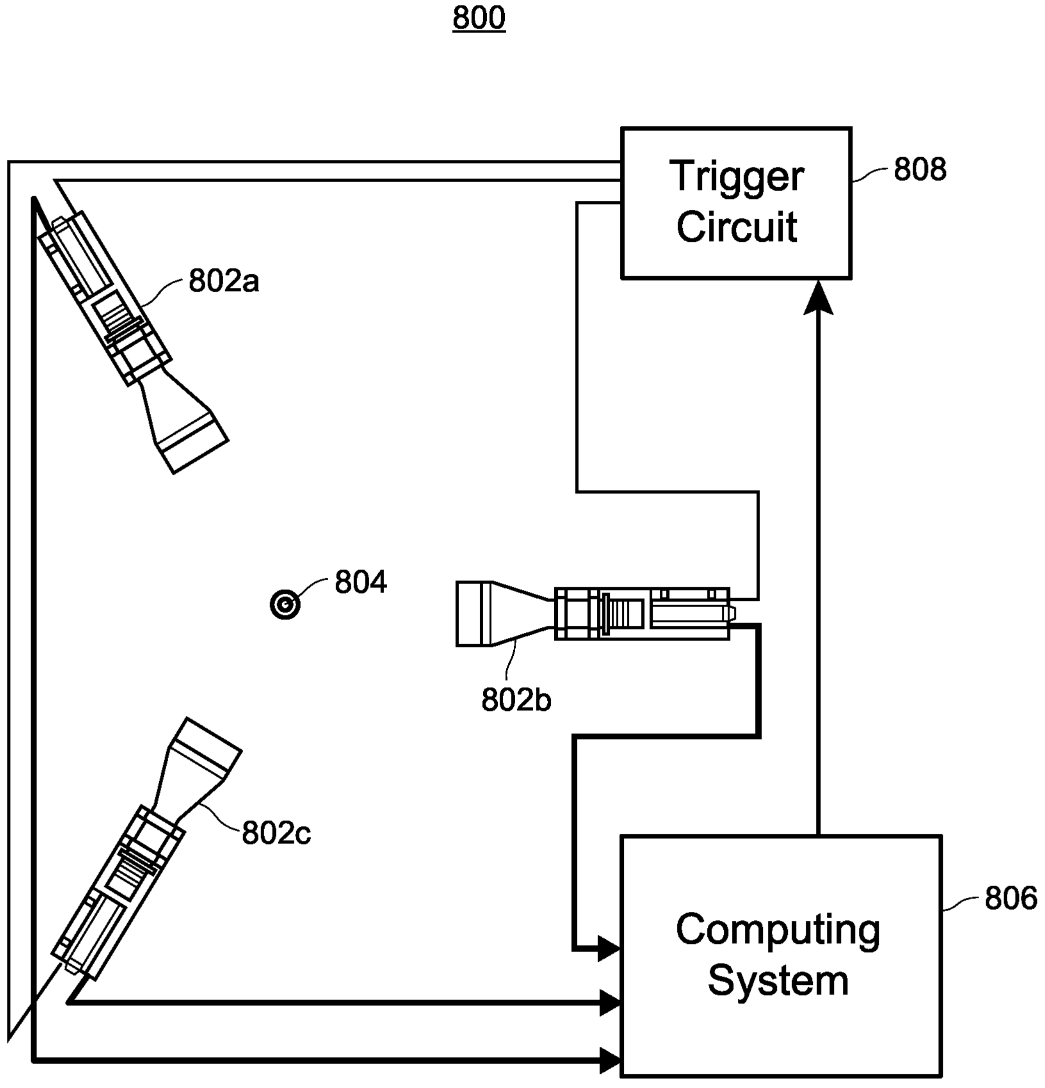
FIG. 8 depicts an example arrangement for synchronizing the capture of 2D images for purposes of generating a 3D image.

As noted above, it can be critical to synchronize the 2D images captured by the multiple cameras, at any given time step, in order to achieve accurate 3D imaging (e.g., without "dropping" particles, and without "stretching" or otherwise distorting the particles, etc.). One example system 800 that may provide the necessary synchronization is shown in FIG. 8. In FIG. 8, cameras 802*a* through 802*c* are directed towards, and have optical axes passing through, a vessel 804. Vessel 804 contains a sample, and may be vessel 400 or 500, held or supported by fixture 306, for example. Cameras 802*a*, 802*b* and 802*c* may be cameras 302*d*, 302*b* and 302*c*, respectively, of FIG. 3, for instance. In other embodiments, the system 800 may include more cameras than are shown in FIG. 8, and/or cameras at different radial positions around vessel 804.

System 800 includes a computing system 806, which may be computing system 604 of FIG. 6, for example. Computing system 806 is communicatively coupled to a trigger circuit 808, which is in turn communicatively coupled to each of cameras 802*a* through 802*c*. The above-noted couplings between computing system 806, trigger circuit 808, and cameras 802*a* through 802*c* are preferably wired. Each of cameras 802*a* through 802*c* is also communicatively coupled (wired or wireless) with computing system 806, in order to provide captured 2D images to computing system 806 for storage/processing.

To trigger a set of 2D images at a given time step, computing system 806 (e.g., VIS control module 632 of FIG. 6) may send a single trigger signal to trigger circuit 808. Trigger circuit 808 may include a printed circuit with electrical hardware components that, in response to the single trigger signal from computing system 806, generate parallel, precisely synchronized electrical signals (e.g., "high" or "low" level voltage pulses) on conductive wires (or traces, etc.) that connect to the respective cameras. Each camera may include circuitry that causes the camera to capture a signal immediately upon detecting or receiving the respective electrical signal. In some embodiments, other synchronization techniques are also used (e.g., the techniques described in U.S. Pat. No. 9,704,239, the entire disclosure of which is incorporated herein by reference).

In some embodiments, software techniques are used to bolster the accuracy of particle tracking (e.g., in addition to the 3D imaging techniques discussed above). In one embodiment, for example, application 620 (or another application executing on computing system 604) leverages the fact that particles are tracked over time to form linked trajectories. For each trajectory, application 620 may generate time-stamped measurements of particle size, particle shape, and/or other metrics. As a given particle moves through the fluid, application 620 may observe fluctuations of these metrics over time to determine whether a particle is indeed a single particle. For example, application 620 may use a 3D variant of a medial axis algorithm to obtain reasonable estimates of the true length of an elongated particle (e.g., a fiber), even if the particle is curved or bent in shape. Even if a particle is self-occluding (e.g., as in FIGS. 1A and 1B), application 620 may determine that an apparent shape (e.g., as in FIG. 1B) is incorrect if that apparent shape is highly transient in nature (e.g., appears over a small/short portion of a given trajectory, but is not present before and/or after that portion of the trajectory). Thus, application 620 may "filter out" apparent shapes that are only present for a very short duration (e.g., less than a threshold time, or less than a threshold percentage of the total time over which the particle is tracked, etc.). 3D image generation module 636 (or another module or application) may then reconstruct the 3D particle (or other object) in a single 3D frame based on the 3D frames immediately before and after the occlusion event.

Additionally or alternatively, in some embodiments, 3D image generation module 636 (or another module or application) may implement processing to ameliorate, or further ameliorate, the problem of "ghost particles" (e.g., as discussed above in connection with FIG. 2). Because ghost particles are likely to be highly transient in nature (i.e., as the real particles that contribute to the phenomenon move relative to one another, and move relative to the optical axes of the various cameras), any ghost particles can generally be expected to disappear rather quickly while the real particles continue to be tracked. Thus, 3D image generation module 636 may filter out particles or other objects whose trajectories are not present (or not otherwise stable) for a sufficiently long period of time.

The 3D imaging techniques described above may provide various advantages, in addition to enhanced accuracy for particle detection, sizing, shape determination, classification, and/or tracking. By using 3D look-up tables, for example, the system can be expanded to any arbitrary number of cameras, at any orientation relative to the vessel/sample (e.g. at points around a sphere that is centered on the vessel). Because the look-up-tables are pre-calculated, adding cameras at different angles, potentially with different lenses, does not necessarily add a substantial computational burden when inspecting any given sample lot. In addition to providing more informative camera perspectives, this approach provides versatility, e.g., by allowing cameras to be moved in order to accommodate other system design considerations, such as conveyance for the vessels/samples under scrutiny (e.g., the path of a robotic arm). This may be important when integrating the technology into larger, automated commercial manufacturing platforms, for example.

Moreover, provided that the optical properties of each camera are known, different types of lenses and cameras can be combined without sacrificing the 3D imaging principles discussed above. This may empower different spectroscopic capabilities or different magnifications, for example. Further, a full 3D ray optics approach, along with knowledge of the true orientation of the vessel shape relative to the vertical axis, can allow for full correction of any spatial alignment errors in the images of different cameras (even, in some embodiments, if the software-based calibration techniques described above are not implemented). The 3D imaging techniques described herein can also be extended to non-cylindrical vessels, which enhances the ability of the technology to extend beyond traditional pharmaceutical manufacturing.

Finally, it is noted that the 3D imaging approach described herein may offer advantages over the (hypothetical) use of a single, 3D plenoptic camera to image the sample. In particular, the multi-camera approach described herein may be lower cost (depending, to some degree, on the choice of the three or more cameras that are used), and may provide a higher overall spatial resolution. Higher resolution may result in part from the flexibility to use higher-resolution camera sensors, but also from the fact that, in the case of a plenoptic camera, the 2D pixel array has to be shared between multiple different focal depths. Thus, the multi-camera approach may be more suitable for the detection of small particles, and/or where more accurate representations of particle morphology are valuable.

Figure 9:
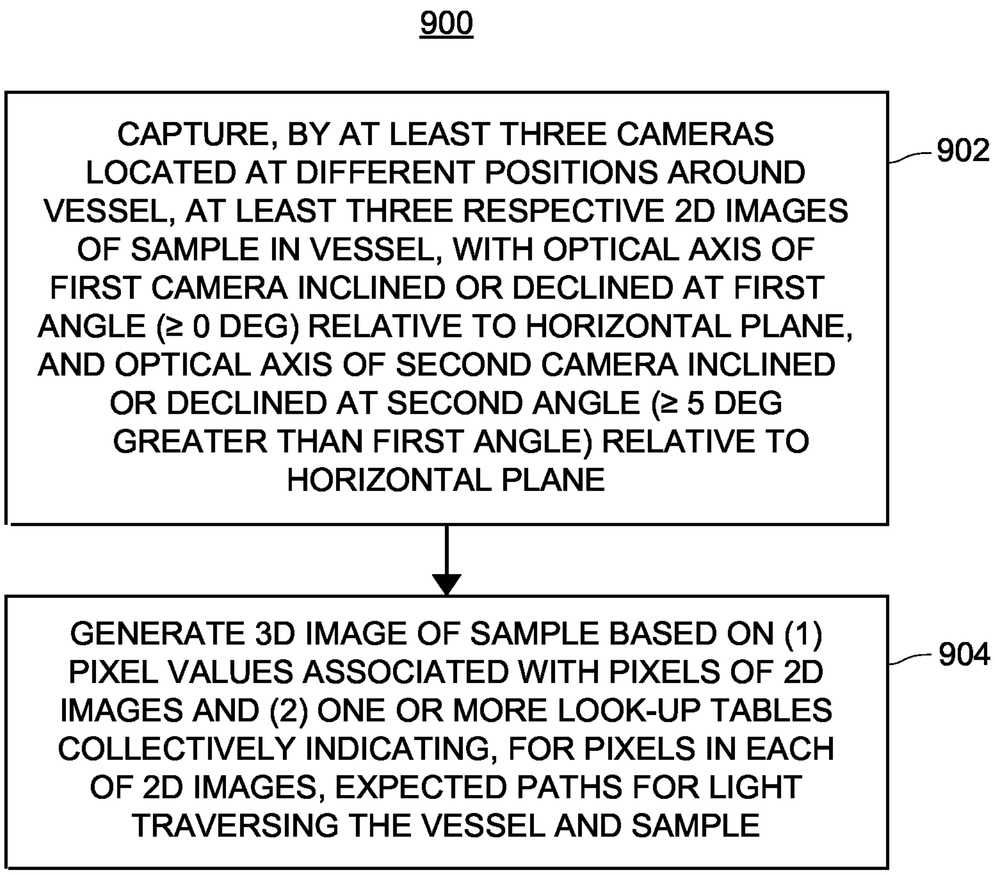
FIG. 9 is a flow diagram of an example method for 3D imaging of a sample in a vessel.

FIG. 9 is a flow diagram of an example method 900 for 3D imaging of a sample in a vessel having a longitudinal axis orthogonal to a horizontal plane. Method 900 may be implemented by one or more portions of system 600 (e.g., visual inspection system 602 and computing system 604) or another suitable system. As a more specific example, block 902 of method 900 may be implemented by at least a portion of visual inspection system 602, while block 904 may be implemented by computing system 604 (e.g., by processing unit 610 when executing instructions stored in memory unit 612).

At block 902, at least three 2D images of a sample in a vessel (e.g., vessel 400 or 500) are captured by at least three cameras located at different positions around the vessel (e.g., cameras 302*a* through 302*d*, or cameras 302*b* through 302*d*, of FIG. 3). The optical axis of a first one of the cameras is inclined or declined at a first angle (greater than or equal to 0 degrees) relative to the horizontal plane, and the optical axis of a second one of the cameras is inclined or declined at a second angle relative to the horizontal plane, with the second angle being at least five degrees greater than the first angle. For example, the first camera may be one of cameras 302*a* through 302*c* of FIG. 3, and the second camera may be camera 302*d* of FIG. 3. In some example embodiments, the second camera may be inclined or declined between 15 and 25 degrees (e.g., 20 degrees) relative to the horizontal plane, or between 10 and 80 degrees, etc. In some embodiments, block 902 includes generating a synchronization signal that causes the at least three cameras to capture the at least three respective 2D images simultaneously (e.g., as discussed above with reference to FIG. 8).

At block 904, a 3D image of the sample is generated based on pixel values (e.g., intensity levels) associated with the pixels of the (at least three) 2D images, and on one or more look-up tables that collectively indicate, for pixels in each of the 2D images, expected paths for light traversing the vessel and the sample (e.g., 3D look-up table 640). Block 904 may include generating a voxel grid. For example, block 904 may include, for each voxel within the voxel grid, using the one or more look-up tables to determine which pixels (of the pixels in the 2D images) correspond to the voxel (e.g., have optical paths intersecting at that voxel), and determining whether to attribute an object or object portion to the voxel ("populate" the voxel) based on the pixel values associated with the determined pixels. As a more specific example, determining whether to attribute the object or object portion to the voxel may include comparing pixel intensity values associated with the determined pixels to an intensity threshold, and then attributing the object or object portion to the voxel only if the pixel intensity values for all of the determined pixels are above the intensity threshold.

In some embodiments, method 900 includes one or more additional blocks not shown in FIG. 9. For example, method 900 may include an additional block at which a clustering algorithm (e.g., k-means or DBSCAN) is used to group voxels within the voxel grid into discrete objects (e.g., for counting, shape determination, classification and/or tracking purposes). Additionally, method 900 may include blocks at which one or more additional 3D images of the sample are generated, and one or more of the discrete objects are tracked across two or more of the 3D images (frames). As a more specific example, tracking the one or more discrete objects may include tracking an apparent discrete object across the two or more 3D images of the sample, and then determining that the apparent discrete object is not an actual object based on instability in a tracked path of the apparent discrete object. The latter determination may involve determining that the apparent discrete object is not an actual object based on a change in direction of the tracked path, and/or disappearance of the apparent discrete object, between two successive 3D images, for example. As a further example, method 900 may include additional blocks at which one or more statistics relating to at least a count and/or size of the discrete objects is/are generated, and at which the statistic(s) is/are caused to be displayed via a user interface (e.g., via display 616).

Figure 10:
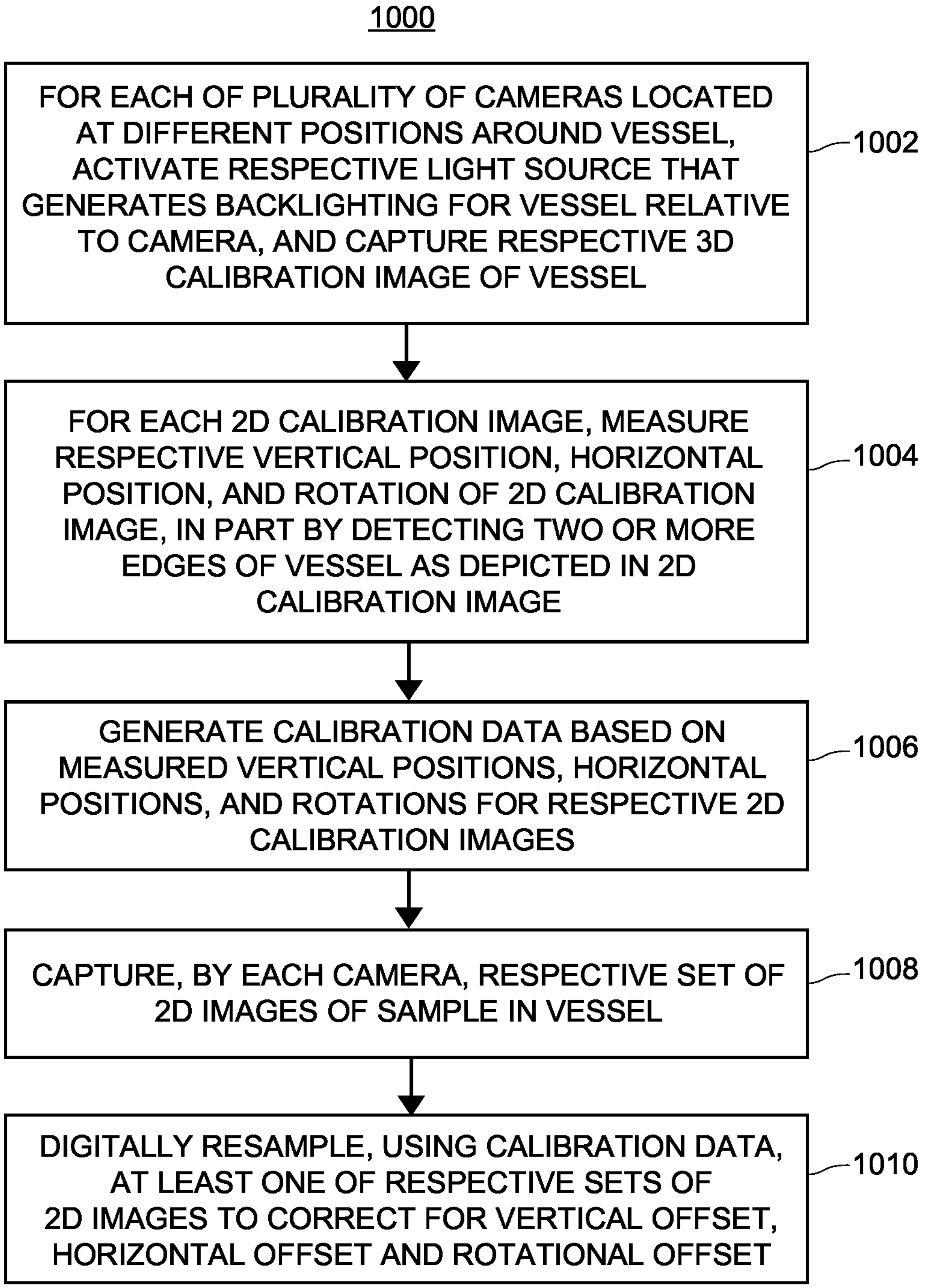
FIG. 10 is a flow diagram of an example method of aligning images for 3D imaging of a sample in a vessel.

FIG. 10 is a flow diagram of an example method 1000 of aligning images for 3D imaging of a sample in a vessel. Method 1000 may be implemented by one or more portions of system 600 (e.g., visual inspection system 602 and computing system 604) or another suitable system. As a more specific example, block 1002 of method 900 may be implemented by computing system 604 (e.g., by processing unit 610 when executing instructions stored in memory unit 612) and visual inspection system 602, blocks 1004 and 1006 may be implemented by computing system 604, block 1008 may be implemented by visual inspection system 602, and block 1010 may be implemented by computing system 604. In some embodiments, method 1000 is used as a calibration technique in conjunction with method 900 of FIG. 9. However, method 1000 may be implemented with other methods (e.g., methods that do not involve use of any inclined or declined camera).

At block 1002, for each camera of a plurality of cameras located at different positions around the vessel (e.g., cameras 302*a* through 302*c*, or 302*a* through 302*d*, of FIG. 3), a respective light source (which provides backlighting relative to the camera) is activated and, while the light source is activated, a respective 2D calibration image of the vessel is captured by the camera. Each light source may be the middle portion of one of light sources 310*a* through 310*c* (e.g., portion 310*a*-2), for example.

At block 1004, for each of the 2D calibration images, a respective vertical position, horizontal position, and rotation (angular position) of the image is measured, in part by detecting two or more edges of the vessel as depicted in the image. Block 1004 may include applying any suitable edge detection technique to detect the edges (e.g., side edges, and possibly bottom edge, of the vessel).

At block 1006, calibration data is generated based on the measured vertical positions, horizontal positions, and rotations for the respective 2D calibration images. The calibration data may be generated by comparing the measured positions/rotation to expected positions/rotation, or by comparing the measured positions/rotation to positions/rotation of a reference calibration image captured by one of the cameras, for example. The generated calibration data may be expressed as scalar values for the values of each camera, or as a matrix for each camera, etc.

At block 1008, a respective set of 2D images of the sample in the vessel is captured by each of the cameras. Block 1008 may include capturing a time series of images by each camera, with synchronization at each time step as discussed above, for example. In some embodiments, block 1008 includes activating one or more light sources (e.g., top and bottom portions of light sources 310*a* through 310*c*) prior to capturing the images, while the backlighting light sources activated at block 1002 are in a deactivated state.

At block 1010, at least one of the respective sets of 2D images (and possibly the sets corresponding to all of the cameras) is/are digitally resampled using the calibration data, to correct for vertical offset, horizontal offset, and rotational offset of the at least one set of 2D images. As noted above, the "offsets" may be relative to an expected position, or relative to the measured position of the vessel as it appeared in the 2D calibration image from another camera, for example. Digital resampling may involve performing a matrix operation on each 2D image using a matrix from the calibration data, for example.

In some embodiments, method 1000 includes one or more additional blocks not shown in FIG. 10. For example, method 1000 may include additional blocks, after block 1010, at which a 2D image from a first of the cameras is assigned to a red channel of a 2D validation image, a 2D image from a second of the cameras is assigned to a green channel of the 2D validation image, and a 2D image from a third of the cameras is assigned to a blue channel of the 2D validation image. In various embodiments, method 1000 may further includes causing the 2D validation image to be displayed to a user for visual confirmation of proper alignment (e.g., via display 616), and/or processing the 2D validation image to automatically determine whether there is proper alignment. In other embodiments (e.g., using more than three cameras), other suitable alignment validation techniques may be used. In another example, method 100 may include an additional block at which one or more 3D images of the sample are generated, based at least in part on pixel values associated with pixels of the digitally resampled set(s) of 2D images (e.g., in accordance with the method 900).

Although the systems, methods, devices, and components thereof, have been described in terms of exemplary embodiments, they are not limited thereto. The detailed description is to be construed as exemplary only and does not describe every possible embodiment of the invention because describing every possible embodiment would be impractical, if not impossible. Numerous alternative embodiments could be implemented, using either current technology or technology developed after the filing date of this patent that would still fall within the scope of the claims defining the invention.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A method of aligning images for three-dimensional (3D) imaging of a sample in a vessel having a longitudinal axis orthogonal to a horizontal plane, the method comprising:

for each camera of a plurality of cameras located at different positions around the vessel,
 activating a respective light source that provides backlighting for the vessel relative to the camera, and
 while the respective light source is activated, capturing, by the camera, a respective two-dimensional (2D) calibration image of the vessel,
wherein each of the plurality of cameras has a respective optical axis, and wherein the optical axis of a tilted camera of the plurality of cameras is inclined or declined at a first angle relative to the horizontal plane, the first angle being greater than zero degrees;

for each 2D calibration image of the respective 2D calibration images, measuring, by one or more processors, a respective vertical position, horizontal position, and rotation of the 2D calibration image, in part by detecting two or more edges of the vessel as depicted in the 2D calibration image, wherein measuring at least the respective vertical position and the respective horizontal position of the 2D calibration image captured by the tilted camera includes using modified versions of expected edge locations or reference image edge locations to compute offsets;

generating, by the one or more processors, calibration data based on the measured vertical positions, horizontal positions, and rotations for the respective 2D calibration images;

capturing, by each camera of the plurality of cameras, a respective set of 2D images of the sample in the vessel; and digitally resampling, by the one or more processors and using the calibration data, at least one set of the respective sets of 2D images to correct for vertical offset, horizontal offset, and rotational offset of the at least one set of 2D images.

2. The method of claim 1, wherein:

at least two cameras of the plurality of cameras have respective optical axes within the horizontal plane; and measuring at least the respective vertical positions and the respective horizontal positions of the 2D calibration images for the at least two cameras includes using the expected edge locations or the reference image edge locations to compute additional offsets.

3. The method of claim 1, wherein each camera of the plurality of cameras includes a telecentric lens.

4. The method of claim 1, wherein the plurality of cameras includes three cameras.

5. The method of claim 4, further comprising, after digitally resampling the at least one set of the respective sets of 2D images:

assigning, by the one or more processors, a 2D image from a first camera of the plurality of cameras to a red channel of a 2D validation image;

assigning, by the one or more processors, a 2D image from a second camera of the plurality of cameras to a green channel of the 2D validation image;

assigning, by the one or more processors, a 2D image from a third camera of the plurality of cameras to a blue channel of the 2D validation image; and causing the 2D validation image to be displayed to a user for visual confirmation of proper alignment.

6. The method of claim 1, further comprising:

generating, by the one or more processors and based at least in part on pixel values associated with pixels of the digitally resampled at least one set of 2D images, one or more 3D images of the sample.

7. The method of claim 1, wherein digitally resampling at least one set of the respective sets of 2D images includes digitally resampling each set of the respective sets of 2D images.

8. A system for three-dimensional (3D) imaging of a sample in a vessel having a longitudinal axis orthogonal to a horizontal plane, the system comprising:

a plurality of cameras located at different positions around the vessel, wherein each of the plurality of cameras has a respective optical axis, and wherein the optical axis of a tilted camera of the plurality of cameras is inclined or declined at a first angle relative to the horizontal plane, the first angle being greater than or equal to zero degrees;

a plurality of light sources, each of the plurality of light sources being positioned relative to the vessel and a different one of the cameras so as to provide backlighting of the vessel when the light source is activated; and a computing system comprising one or more processors and a memory, the memory storing instructions that, when executed by the one or more processors, cause the computing system to for each camera of the plurality of cameras, activate a respective one of the light sources, and while the respective light source is activated, trigger the camera to capture a respective two-dimensional (2D) calibration image of the vessel, for each 2D calibration image of the respective 2D calibration images, measure a respective vertical position, horizontal position, and rotation of the 2D calibration image, in part by detecting two or more edges of the vessel as depicted in the 2D calibration image, wherein measuring at least the respective vertical position and the respective horizontal position of the 2D calibration image captured by the tilted camera includes using modified versions of expected edge locations or reference image edge locations to compute offsets, generate calibration data based on the measured vertical positions, horizontal positions, and rotations for the respective 2D calibration images, for each camera of the plurality of cameras, trigger the camera to capture a respective set of 2D images of the sample in the vessel, and digitally resample, using the calibration data, at least one set of the respective sets of 2D images to correct for vertical offset, horizontal offset, and rotational offset of the at least one set of 2D images.

9. The system of claim 8, wherein:

at least two cameras of the plurality of cameras have respective optical axes within the horizontal plane; and measuring at least the respective vertical positions and the respective horizontal positions of the 2D calibration images for the at least two cameras includes using the expected edge locations or the reference image edge locations to compute additional offsets.

10. The system of claim 8, wherein each camera of the plurality of cameras includes a telecentric lens.

11. The system of claim 8, wherein the plurality of cameras includes three cameras.

12. The system of claim 11, wherein the instructions further cause the computing system to, after digitally resampling the at least one set of the respective sets of 2D images:

assign a 2D image from a first camera of the plurality of cameras to a red channel of a 2D validation image;

assign a 2D image from a second camera of the plurality of cameras to a green channel of the 2D validation image;

assign a 2D image from a third camera of the plurality of cameras to a blue channel of the 2D validation image; and display the 2D validation image to a user for visual confirmation of proper alignment.

13. The system of claim 8, wherein the instructions further cause the computing system to:

generate, based at least in part on pixel values associated with pixels of the digitally resampled at least one set of 2D images, one or more 3D images of the sample.

14. The system of claim 8, wherein the instructions cause the computing system to digitally resample each set of the respective sets of 2D images.

15. A non-transitory, computer-readable medium storing instructions that, when executed by one or more processors of a computing system, cause the computing system to:

for each camera of a plurality of cameras, activate a respective one of a plurality of light sources to provide backlighting for a vessel relative to the camera, the vessel having a longitudinal axis orthogonal to a horizontal plane, and while the respective light source is activated, trigger the camera to capture a respective two-dimensional (2D) calibration image of the vessel, wherein each of the plurality of cameras has a respective optical axis, and wherein the optical axis of a tilted camera of the plurality of cameras is inclined or declined at a first angle relative to the horizontal plane, the first angle being greater than zero degrees;

for each 2D calibration image of the respective 2D calibration images, measure a respective vertical position, horizontal position, and rotation of the 2D calibration image, in part by detecting two or more edges of the vessel as depicted in the 2D calibration image, wherein measuring at least the respective vertical position and the respective horizontal position of the 2D calibration image captured by the tilted camera includes using modified versions of expected edge locations or reference image edge locations to compute offsets;

generate calibration data based on the measured vertical positions, horizontal positions, and rotations for the respective 2D calibration images;

for each camera of the plurality of cameras, trigger the camera to capture a respective set of 2D images of a sample in the vessel; and digitally resample, using the calibration data, at least one set of the respective sets of 2D images to correct for vertical offset, horizontal offset, and rotational offset of the at least one set of 2D images.

16. The non-transitory, computer-readable medium of claim 15, wherein each of the plurality of cameras includes a telecentric lens.

17. The non-transitory, computer-readable medium of claim 15, wherein the plurality of cameras includes three cameras.

18. The non-transitory, computer-readable medium of claim 17, wherein the instructions further cause the computing system to, after digitally resampling the at least one set of the respective sets of 2D images:

assign a 2D image from a first camera of the plurality of cameras to a red channel of a 2D validation image;

assign a 2D image from a second camera of the plurality of cameras to a green channel of the 2D validation image;

assign a 2D image from a third camera of the plurality of cameras to a blue channel of the 2D validation image; and display the 2D validation image to a user for visual confirmation of proper alignment.

19. The non-transitory, computer-readable medium of claim 15, wherein the instructions further cause the computing system to:

generate, based at least in part on pixel values associated with pixels of the digitally resampled at least one set of 2D images, one or more 3D images of the sample.

20. The non-transitory, computer-readable medium of claim 15, wherein the instructions cause the computing system to digitally resample each set of the respective sets of 2D images.

* * * * *